United States Patent
Young et al.

(10) Patent No.: US 9,928,233 B2
(45) Date of Patent: Mar. 27, 2018

(54) COMPUTER-IMPLEMENTED METHODS AND SYSTEMS FOR CLUSTERING USER REVIEWS AND RANKING CLUSTERS

(71) Applicant: Applause App Quality, Inc., Southborough, MA (US)

(72) Inventors: Heidi A. Young, Woodinville, WA (US); Jason M. Stredwick, Woodinville, WA (US); Yashas Mavianakere, Bellevue, WA (US)

(73) Assignee: Applause App Quality, Inc., Framingham, MA (US)

( * ) Notice: Subject to any disclaimer, the term of this patent is extended or adjusted under 35 U.S.C. 154(b) by 340 days.

(21) Appl. No.: 14/539,623

(22) Filed: Nov. 12, 2014

(65) Prior Publication Data
US 2016/0132504 A1    May 12, 2016

(51) Int. Cl.
  *G06F 17/30*      (2006.01)
  *G06F 17/27*      (2006.01)
  *G06Q 30/02*      (2012.01)

(52) U.S. Cl.
  CPC ........ *G06F 17/277* (2013.01); *G06F 17/3071* (2013.01); *G06Q 30/0282* (2013.01)

(58) Field of Classification Search
  USPC ........ 707/607, 608, 687, 705, 790, 813, 821
  See application file for complete search history.

(56) References Cited

U.S. PATENT DOCUMENTS

| | | |
|---|---|---|
| 6,901,582 B1 | 5/2005 | Harrison |
| 7,337,124 B2 | 2/2008 | Corral |
| 7,516,438 B1 | 4/2009 | Leonard et al. |
| 7,849,447 B1 | 12/2010 | Karis et al. |
| 8,543,576 B1 | 9/2013 | Buryak et al. |
| 8,972,391 B1 | 3/2015 | McDonnell et al. |
| 9,367,823 B1 | 6/2016 | Mihalik et al. |
| 2002/0165859 A1 | 11/2002 | Iyengar et al. |
| 2003/0065597 A1 | 4/2003 | Smith et al. |
| 2004/0103092 A1 | 5/2004 | Tuzhilil et al. |
| 2004/0172612 A1 | 9/2004 | Kasravi et al. |
| 2005/0075962 A1 | 4/2005 | Dunne |
| 2006/0149575 A1 | 7/2006 | Varadarajan et al. |
| 2006/0195566 A1 | 8/2006 | Hurley |
| 2007/0016672 A1 | 1/2007 | Wilson et al. |
| 2009/0307105 A1 | 12/2009 | Lemay et al. |
| 2010/0277411 A1 | 11/2010 | Yee et al. |
| 2010/0306191 A1 | 12/2010 | LeBeau et al. |
| 2011/0258067 A1 | 10/2011 | Rowell |
| 2012/0016678 A1 | 1/2012 | Gruber et al. |
| 2012/0042164 A1 | 2/2012 | Gagnon et al. |
| 2012/0069131 A1 | 3/2012 | Abelow |
| 2012/0191694 A1 | 7/2012 | Gardiol et al. |
| 2012/0233165 A1 | 9/2012 | Kirkpatrick |

(Continued)

OTHER PUBLICATIONS

Machine Learning :: Cosine Similarity for Vector Dec. 9, 2013 Space Models (Part III) Terra Incognita.*
U.S. Appl. No. 13/910,433, filed Jun. 5, 2013, Arbon et al.

*Primary Examiner* — Sana Al Hashemi
(74) *Attorney, Agent, or Firm* — Wolf, Greenfield & Sacks, P.C.

(57) ABSTRACT

Computer-implemented methods and systems are disclosed for organizing user reviews, especially computer app reviews, into clusters and ranking the clusters so that the reviews may be more meaningfully analyzed.

34 Claims, 3 Drawing Sheets

(56) References Cited

U.S. PATENT DOCUMENTS

| | | |
|---|---|---|
| 2012/0265814 A1 | 10/2012 | Roussis |
| 2013/0013492 A1 | 1/2013 | Nelson |
| 2013/0073618 A1 | 3/2013 | Takamura et al. |
| 2013/0191397 A1 | 7/2013 | Avadhanam et al. |
| 2013/0231258 A1 | 9/2013 | Wilde et al. |
| 2014/0156660 A1 | 6/2014 | Arbon et al. |
| 2014/0282480 A1 | 9/2014 | Matthew et al. |
| 2014/0282493 A1 | 9/2014 | Glover et al. |
| 2015/0051948 A1* | 2/2015 | Aizono .................. G06Q 10/00 705/7.29 |

\* cited by examiner

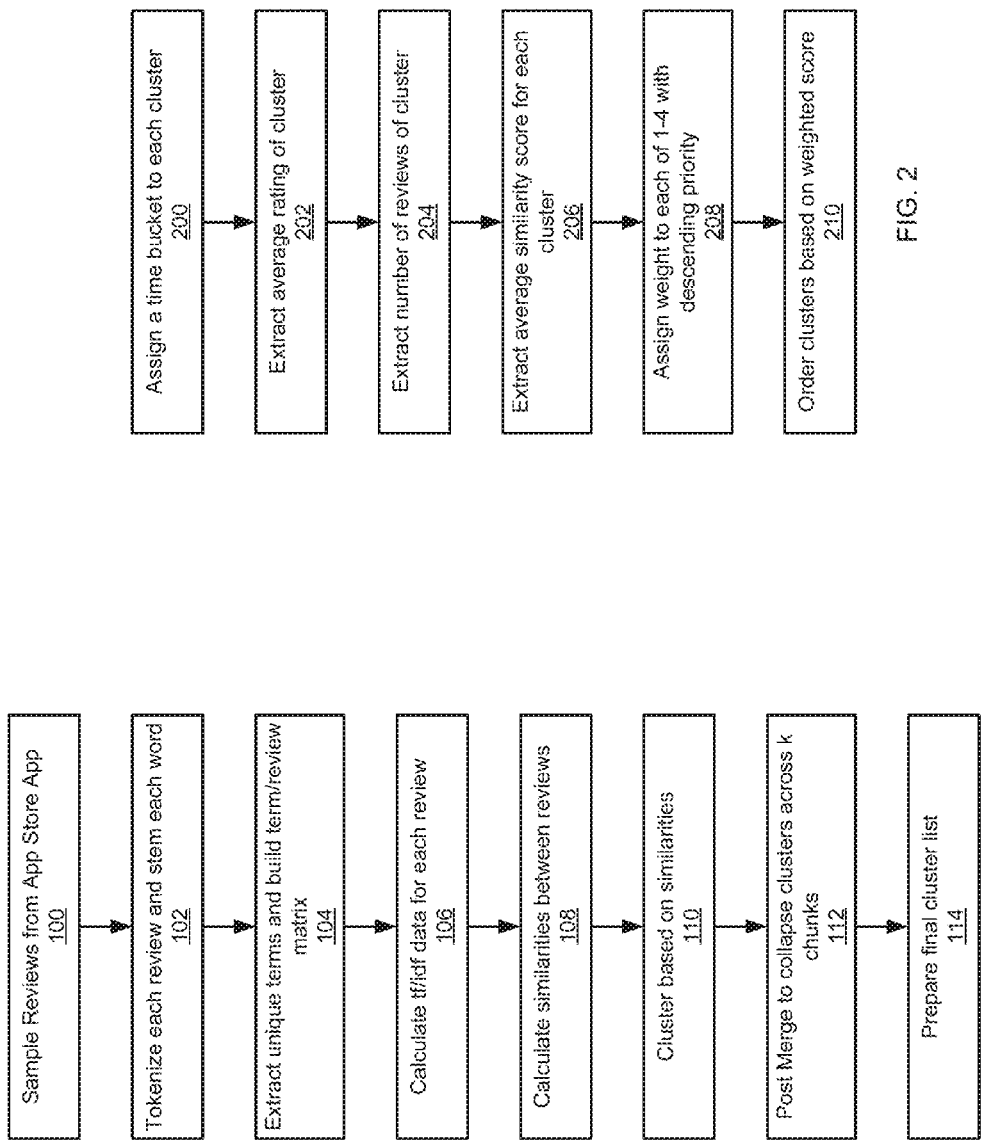

Can't deposit checks khordy - 8/13/2014

When I get ready to take the picture of the check to deposit the app crashes

*Signals: Crashes*
*Attributes: Stability*

Snail moves faster

8/12/2014

Unable to deposit. Crashing

Terrible for making deposits ross - 8/12/2014

The app is generally ok but it gets ruined by its mediocrity at depositing checks. It is unable to recognize endorsements swiftly, which means you have to take multiple pictures of the check backside before it eventually accepts it. Incredibly frustrating.

*Signals: Frustration*
*Attributes: Usability*

Crash at deposit check

COMMON - 8/11/2014

The version can't deposit check on my 4s, it crashes at taking the first photo

FIG. 4

COMPUTER-IMPLEMENTED METHODS AND SYSTEMS FOR CLUSTERING USER REVIEWS AND RANKING CLUSTERS

BACKGROUND

The present application relates generally to analysis of user reviews and, more particularly, to computer-implemented methods and systems for organizing such reviews into clusters and ranking the clusters so that the reviews may be more meaningfully analyzed.

An app is a computer program designed to run on a computer device or system, including, without limitation, mobile devices (such as smartphones and tablet computers), desktop computers, wearable computers, connected devices, etc. App stores, from which apps can be downloaded, allow app users to create and publicly share their reviews of apps. This allows users to praise app developers for effective new features, but it also allows users to post complaints on a public stage and to expose undesirable elements of apps.

Given the steady influx of review data flowing into app stores, app developers need to constantly monitor the incoming stream of user feedback. However, many apps get hundreds and even thousands of reviews a day, and it can be difficult for app developers to keep up with the issues raised by app users.

BRIEF SUMMARY OF THE DISCLOSURE

In accordance with one or more embodiments, a method is provided for organizing user reviews for data analysis. The method, which is implemented in a computer system, includes the steps of (a) sampling a plurality of reviews to be analyzed from one or more sources; (b) identifying unique terms in each of the plurality of reviews; (c) determining frequency values indicating the number of times each of the unique terms appears in each of the plurality of reviews; (d) adjusting the frequency values for each unique term to account for the rarity of that unique term across the plurality of reviews; (e) calculating the similarities between the reviews based on the frequency values as adjusted in step (d); and (f) grouping the reviews into clusters based on the similarities of the reviews determined in step (e).

In accordance with one or more further embodiments, a computer system is provided, including at least one processor, memory associated with the at least one processor, and a program supported in the memory for organizing user reviews for data analysis. The program contains a plurality of instructions which, when executed by the at least one processor, cause the at least one processor to: (a) sample a plurality of reviews to be analyzed from one or more sources; (b) identify unique terms in each of the plurality of reviews; (c) determine frequency values indicating the number of times each of the unique terms appears in each of the plurality of reviews; (d) adjust the frequency values for each unique term to account for the rarity of that unique term across the plurality of reviews; (e) calculate the similarities between the reviews based on the frequency values as adjusted in (d); and (f) group the reviews into clusters based on the similarities of the reviews determined in (e).

BRIEF DESCRIPTION OF THE DRAWINGS

FIG. 1 is a simplified flow chart illustrating an exemplary method for organizing app reviews into clusters in accordance with one or more embodiments.

FIG. 2 is a simplified flow diagram illustrating an exemplary method for ranking clusters of reviews in accordance with one or more embodiments.

FIG. 4 is a screenshot illustrating additional information on a cluster shown to a system user in accordance with one or more embodiments.

DETAILED DESCRIPTION

Figure 3:
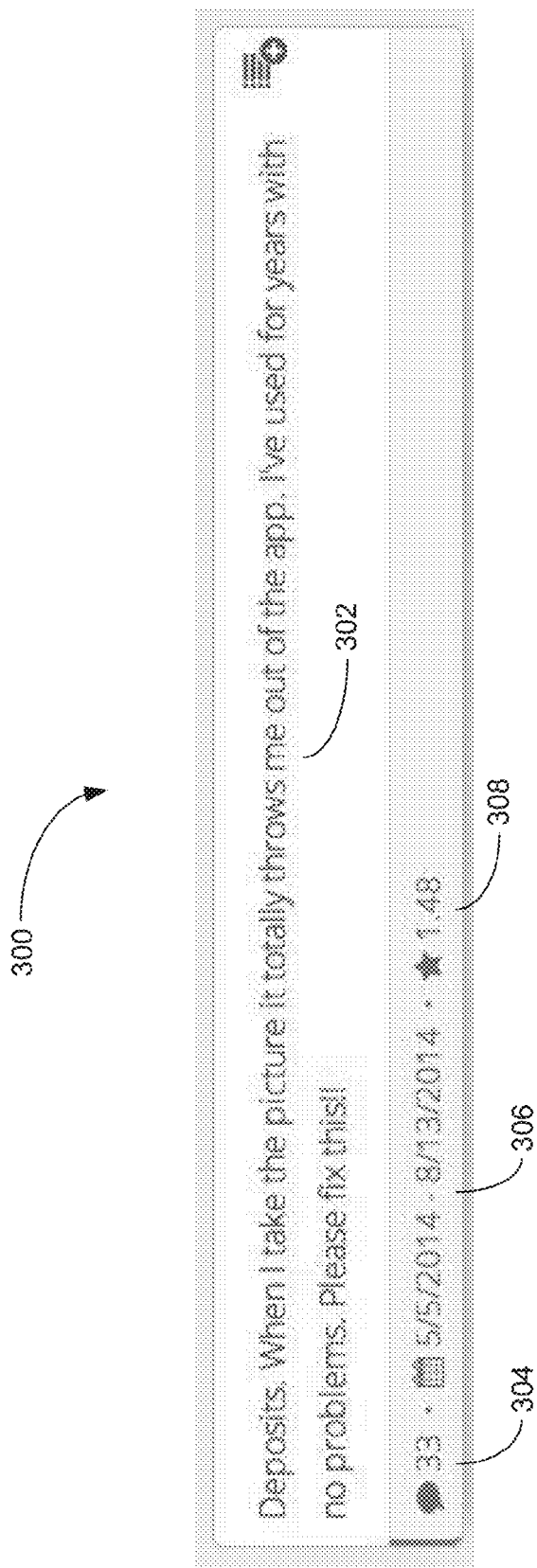
FIG. 3 is a screenshot illustrating an exemplary representation of a review cluster shown to a system user in accordance with one or more embodiments.

Various embodiments disclosed herein are directed to computer-implemented methods and systems for organizing app reviews into clusters and ordering the clusters so that user review data can be more effectively analyzed by app developers to improve their apps.

The methods and systems for clustering reviews may be used for organizing generally any feedback related corpus that includes text feedback and a scaled rating such as, e.g., a star or numerical rating.

While the exemplary embodiments disclosed herein refer to user reviews for apps, it should be understood that the clustering techniques described herein can be used for analyzing user reviews involving generally any subject matter.

FIG. 1 is a simplified flow chart illustrating an exemplary process for organizing app reviews into clusters in accordance with one or more embodiments. The reviews may be obtained from app stores or other sites displaying reviews, e.g., by crawling the site.

At step 100, a set of reviews collected for an app are sampled, as desired. For instance, a user of the clustering system may choose to sample only the last N reviews or only reviews posted in the last M days.

At step 102, the text comments in the sampled reviews are tokenized. Tokenization refers to the process of breaking a stream of text into a set of words.

Each of the words is then reduced to a stem, i.e., to its root meaning. For instance, the words "crashed" and "crashing" would be stemmed to "crash." The stemmed words (and words already in root form) in reviews are referred to herein as "terms."

At step 104, all unique terms in a review are extracted and placed in a term/review matrix. In an exemplary matrix, each row identifies a review and each column identifies a unique term, and the matrix specifies the frequency of terms within each review.

At step 106, "tf/idf" (term frequency/inverse document frequency) data is calculated for each review in order to determine how important each term is to a review within the set of reviews to control for the fact that some terms are more commonly used than others.

tf=the raw frequency of a term within a review.

idf=log(total number of reviews/total number of reviews containing the term).

The calculated tf/idf values are placed in respective row/column cells in the term/review matrix. The matrix is then normalized.

The user of the clustering system selects a similarity threshold, which can be based, e.g., on the total number of reviews posted for the app, the total number posted in the last M days, and the total number selected for the sample. In one example, similarity thresholds range between 0.20-0.35.

The reviews are divided up into k number of chunks of equal number of reviews. In one or more embodiments, the reviews are separated into chunks based on when each review was posted.

At step 108, the similarity of each review is calculated against every other review in the chunk, cos_sim(ri, rj), using standard cosine similarity between each pair of reviews.

For each pair of reviews, if cos_sim(ri, rj)>sim_threshold, the reviews are clustered at step 110.

The transitive property is used for an initial pass through reviews for clustering reviews. For example: If ri~rj, and rj~rk, then ri, rj, rk form a cluster.

A merge list is then created in order to merge clusters with sufficiently similar reviews. For instance, if cluster1=[ri, rj, rk] and cluster2=[rl, rm, rn], and ri~rn, then the clusters are added to merge list.

Next, the system passes through the merge list. Clusters 1 and 2 are merged only if sim_score(ri, rn)>avg(sim_score for cluster1) and >avg(sim_score for cluster2); otherwise the clusters are left unmerged. Thus, even though there is a link between cluster 1 and cluster 2, it may not be strong enough to group the clusters together.

Clusters can also be merged based on cluster centroids within each chunk. A cluster similarity threshold, C, is first selected based on samplings of apps across markets and categories. The centroid of each cluster is calculated using a standard calculation that takes each review within the cluster and uses the row that represents the review as a point in n-dimensional space. Centroid calculation generally finds the geometric center of all the points. The cosine similarity between clusters based on their centroids is calculated. Clusters with a cluster similarity threshold>C are merged.

At step 112, a post merge process is performed to collapse clusters across k chunks. Clusters again are merged based on cluster centroids. A cluster similarity threshold, C, is selected based on sampling of apps across markets and categories, C. The centroid of each cluster is calculated. The cosine similarity between clusters based on their centroids is calculated. Clusters with a cluster similarity threshold>C are merged.

At step 114, a final cluster list is prepared of all reviews within X number of arbitrary clusters for an app, based on similarity of text and number of reviews per app.

In accordance with one or more further embodiments, methods and system are provided for ranking clusters, which are formed as described above.

FIG. 2 is a simplified flow diagram illustrating an exemplary process for ranking clusters in accordance with one or more embodiments.

At step 200, a time bucket is assigned to each cluster. The time buckets are broken down into N chunks, from the most recent to the least recent review in the sample. For example, if the cluster contains a review within the last 24 hours, assign time_bucket=1, and if the cluster contains a review within the last 72 hours, assign time_bucket=3. In each case, the most recent review in cluster a determines the time bucket for that cluster.

At step 202, the average rating of each cluster is extracted. The star rating of all reviews within the cluster are averaged. For example, if ri=1 star, rj=1 star, rk=5 star, rl=5 star, the average_star_rating for cluster=3 star.

At step 204, the number of reviews in each cluster is extracted.

At step 206, the average similarity score for each cluster is extracted. The similarity rating of all reviews within the cluster is averaged, given every pairwise review within the cluster was clustered based on similarity. For example:

$$\cos\_sim(ri, rj)=0.50, \cos\_sim(ri, rk)=0.60, \text{average\_similarity\_score for cluster}=0.55.$$

At step 208, a weight is assigned to each cluster for each of the features identified above with descending priority. Recent time buckets are assigned higher weights than older time buckets. Negative star ratings are assigned higher weights than positive ratings. Higher number of reviews in a cluster are assigned higher weights than a lower number of reviews. Higher similarity scores are assigned higher weights than lower similarity scores.

At step 210, the clusters are ordered based on the weighted scores, built by linear function:

$$\text{Weighted\_score}=m1*x1+m2*x2+m3*x3+m4*x4,$$
where $mi$=weight of feature $xi$, and $xi$=value for that cluster for an app.

The result of the process is an ordered list of clustered reviews for one specific app.

By way of example, FIG. 3 is an exemplary screenshot of a screen or window shown on a computer display to a user of the clustering system. The display shows a representation of a review cluster 300. The cluster includes text 302 that is representative of similar text found in the reviews in the cluster. The total number of reviews in the cluster are indicated at 304. The time period over which the reviews were posted is indicated at 306. The average star rating of reviews in the cluster is indicated at 308.

A user of the system can zoom in on the cluster 300 in FIG. 3 by clicking on it. FIG. 4 is an exemplary screenshot showing further information on a selected cluster, where the user can view each of the posted reviews in the cluster.

The processes of clustering reviews and ranking clusters described above may be implemented in software, hardware, firmware, or any combination thereof. The processes are preferably implemented in one or more computer programs executing on a programmable computer including a processor, a storage medium readable by the processor (including, e.g., volatile and non-volatile memory and/or storage elements), and input and output devices. Each computer program can be a set of instructions (program code) in a code module resident in the random access memory of the computer. Until required by the computer, the set of instructions may be stored in another computer memory (e.g., in a hard disk drive, or in a removable memory such as an optical disk, external hard drive, memory card, or flash drive) or stored on another computer system and downloaded via the Internet or other network. Program code may be applied to input entered using the input device to perform the functions described and to generate output. The output may be provided to one or more output devices.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer system may comprise one or more physical machines, or virtual machines running on one or more physical machines. In addition, the computer server system may comprise a cluster of computers or numerous distributed computers that are connected by the Internet or another network.

Accordingly, the foregoing description and attached drawings are by way of example only, and are not intended to be limiting.

What is claimed is:

1. A method of organizing user reviews for data analysis, comprising the steps, each implemented in a computer system, of:
   (a) sampling a plurality of reviews from one or more sources;
   (b) identifying unique terms in each of said plurality of reviews;
   (c) determining frequency values indicating the number of times each of the unique terms appears in each of said plurality of reviews, wherein determining the frequency values includes generating a term/review matrix having a plurality of rows and columns, in which each row identifies a review and each column identifies a unique term, and wherein the matrix specifies the frequency values for respective unique terms;
   (d) adjusting the frequency values for each unique term to account for the rarity of that unique term across the plurality of reviews, wherein adjusting the frequency values includes normalizing the values in the matrix based on values associated with the rarity of the unique term across the plurality of reviews being analyzed;
   (e) calculating similarities between the reviews based on the frequency values as adjusted in step (d); and
   (f) grouping the reviews into clusters based on the similarities of the reviews determined in step (e).

2. A computer system, comprising:
   at least one processor;
   memory associated with the at least one processor; and
   a program supported in the memory for organizing user reviews for data analysis, the program containing a plurality of instructions which, when executed by the at least one processor, cause the at least one processor to:
   (a) sample a plurality of reviews from one or more sources;
   (b) identify unique terms in each of said plurality of reviews;
   (c) determine frequency values indicating the number of times each of the unique terms appears in each of said plurality of reviews wherein determining the frequency values includes generating a term/review matrix having a plurality of rows and columns, in which each row identifies a review and each column identifies a unique term, and wherein the matrix specifies the frequency values for respective unique terms;
   (d) adjust the frequency values for each unique term to account for the rarity of that unique term across the plurality of reviews, wherein adjusting the frequency values includes normalizing the values in the matrix based on values associated with the rarity of the unique term across the plurality of reviews being analyzed;
   (e) calculate similarities between the reviews based on the frequency values as adjusted in (d); and
   (f) group the reviews into clusters based on the similarities of the reviews determined in (e).

3. The method of claim 1, wherein step (b) comprises tokenizing text in each of said plurality of reviews into a set of words and stemming each word not already in root form to generate a set of terms for each review, from which said unique terms are identified.

4. The method of claim 1, wherein step (d) comprises calculating tf/idf values for each review, wherein tf=the raw frequency of a term within a review, and idf=log(total number of reviews/total number of reviews containing the term), and wherein the tf/idf values comprise the frequency values adjusted in step (d).

5. The method of claim 1, wherein similarities between the reviews are calculated in step (e) using a standard cosine similarity calculation.

6. The method of claim 1, wherein steps (e) and (f) comprise dividing the reviews into a given number of chunks, calculating the similarity of each review against every other review in each chunk, and for each pair of reviews whose similarity exceeds a given threshold, clustering said reviews.

7. The method of claim 1, further comprising ranking the clusters.

8. The method of claim 1, further comprising displaying the clusters to a user on a computer display.

9. The computer system of claim 2, wherein (b) comprises tokenizing text in each of said plurality of reviews into a set of words and stemming each word not already in root form to generate a set of terms for each review, from which said unique terms are identified.

10. The computer system of claim 2, wherein (d) comprises calculating tf/idf values for each review, wherein tf=the raw frequency of a term within a review, and idf=log (total number of reviews/total number of reviews containing the term), and wherein the tf/idf values comprise the frequency values adjusted in (d).

11. The computer system of claim 2, wherein similarities between the reviews are calculated in (e) using a standard cosine similarity calculation.

12. The computer system of claim 2, wherein (e) and (f) comprise dividing the reviews into a given number of chunks, calculating the similarity of each review against every other review in each chunk, and for each pair of reviews whose similarity exceeds a given threshold, clustering said reviews.

13. The computer system of claim 2, wherein the program further comprises instructions for ranking the clusters.

14. The computer system of claim 2, wherein the program further comprises instructions for displaying the clusters to a user on a computer display.

15. The method of claim 4, further comprising normalizing the term/review matrix.

16. The method of claim 6, further comprising using the transitive property for clustering reviews.

17. The method of claim 6, further comprising merging clusters with similarly sufficient reviews.

18. The method of claim 6, further comprising performing a post merge process to collapse clusters across chunks.

19. The method of claim 7, wherein the clusters are ranked based on a plurality of factors.

20. The method of claim 7, further comprising displaying the clusters to a user on a computer device, wherein the clusters are displayed in order of ranking.

21. The method of claim 8, wherein information displayed for each cluster includes one or more of: text representative of similar text found in the reviews in the cluster, the total number of reviews in the cluster, the time period over which the reviews in the cluster were posted, and the average rating of the reviews in the cluster.

22. The computer system of claim 10, wherein the program further comprises instructions for normalizing the term/review matrix.

23. The computer system of claim 12, wherein the program further comprises instructions for using the transitive property for clustering reviews.

24. The computer system of claim 12, wherein the program further comprises instructions for merging clusters with similarly sufficient reviews.

25. The computer system of claim 12, wherein the program further comprises instructions for performing a post merge process to collapse clusters across chunks.

26. The computer system of claim 13, wherein the clusters are ranked based on a plurality of factors.

27. The computer system of claim 13, wherein the program further comprises instructions for displaying the clusters to a user on a computer device, wherein the clusters are displayed in order of ranking.

28. The computer system of claim 14, wherein information displayed for each cluster includes one or more of: text representative of similar text found in the reviews in the cluster, the total number of reviews in the cluster, the time period over which the reviews in the cluster were posted, and the average rating of the reviews in the cluster.

29. The method of claim 17, wherein the clusters are merged based on cluster centroids within each chunk.

30. The method of claim 19, wherein said factors include one or more of: the date or time of the most recent review in a cluster, the average rating of the reviews in a cluster, the number of reviews in a cluster, and the average similarity score of the reviews in a cluster.

31. The computer system of claim 24, wherein the clusters are merged based on cluster centroids within each chunk.

32. The computer system of claim 26, wherein said factors include one or more of: the date or time of the most recent review in a cluster, the average rating of the reviews in a cluster, the number of reviews in a cluster, and the average similarity score of the reviews in a cluster.

33. The method of claim 30, wherein the factors are weighted such that clusters with more recent reviews, lower average ratings, higher number of reviews, and higher average similarity scores are assigned higher weights.

34. The computer system of claim 32, wherein the factors are weighted such that clusters with more recent reviews, lower average ratings, higher number of reviews, and higher average similarity scores are assigned higher weights.

* * * * *